United States Patent [19]
Smith

[11] 3,950,727
[45] Apr. 13, 1976

[54] FOLD-AWAY REAR TURN INDICATORS FOR MOTORCYCLES

[76] Inventor: Paul H. Smith, 5800 S. Y St., Fort Smith, Ark. 72901

[22] Filed: June 19, 1975

[21] Appl. No.: 588,510

[52] U.S. Cl. .................... 340/134; 116/51; 340/73
[51] Int. Cl.² ...................... B60Q 1/34; B62J 5/00
[58] Field of Search ............................ 116/51–54, 116/35 R, 35 A; 280/289; 340/134, 73; 240/7.55

[56] References Cited
UNITED STATES PATENTS

| 1,412,206 | 4/1922 | Golden | 116/35 R |
| 1,498,943 | 6/1924 | Ackerson | 116/54 |
| 1,847,115 | 3/1932 | Kümmerle et al. | 116/35 A |
| 1,921,349 | 8/1933 | Cunard | 116/54 |
| 2,540,394 | 2/1951 | Hollingsworth | 116/52 |

FOREIGN PATENTS OR APPLICATIONS

| 179,305 | 11/1935 | Switzerland | 280/289 |
| 323,498 | 9/1957 | Switzerland | 280/289 |
| 834,957 | 7/1949 | Germany | 280/289 |
| 831,646 | 2/1952 | Germany | 116/35 |
| 964,266 | 8/1950 | France | 116/35 |
| 1,281,787 | 12/1961 | France | 340/134 |

Primary Examiner—Richard C. Queisser
Assistant Examiner—Daniel M. Yasich

[57] ABSTRACT

Left and right turn indicators for being installed on a rear of a motorcycle. The indicators each being mounted upon a pivotable bracket, so they can be pivoted between a sidewardly extended position for displaying the turn signal in highway and street traffic, and in a rearwardly retracted position of non-use, in order to be out of the way when motorcycle is used in rural trail riding and hill climbing.

2 Claims, 4 Drawing Figures

U.S. Patent   April 13, 1976   3,950,727
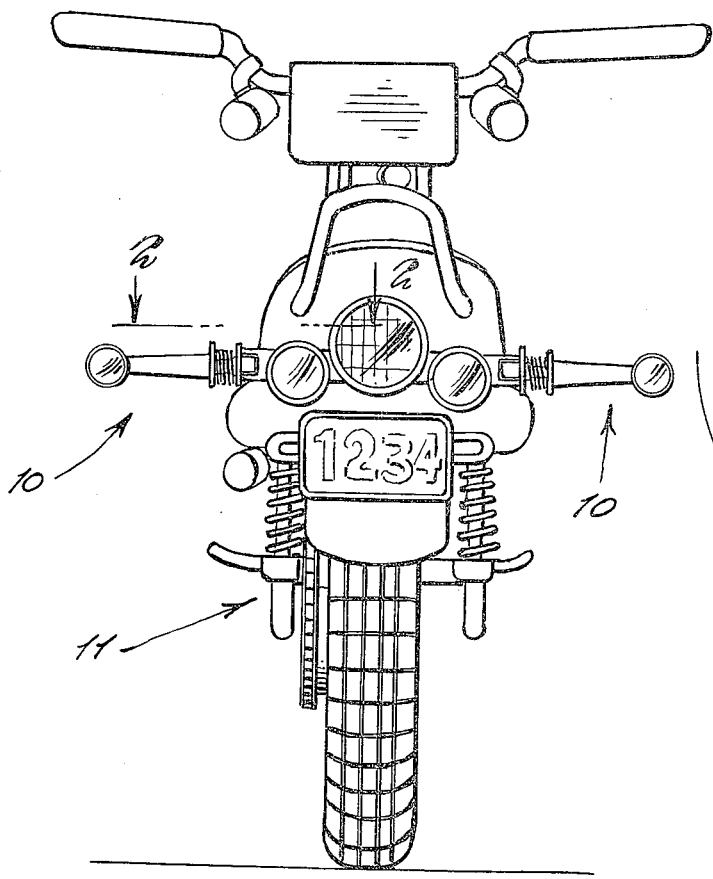
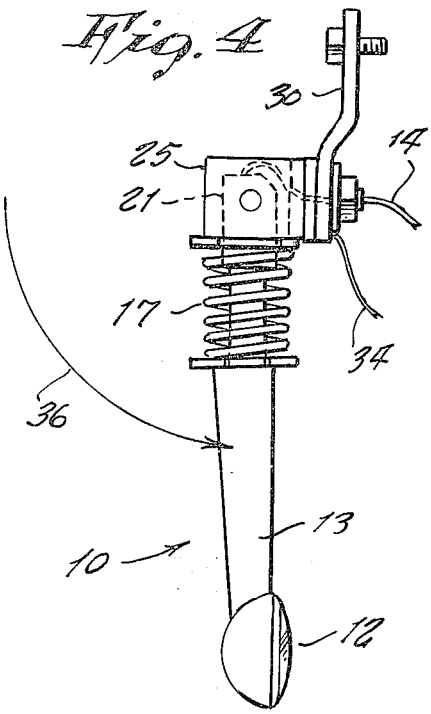
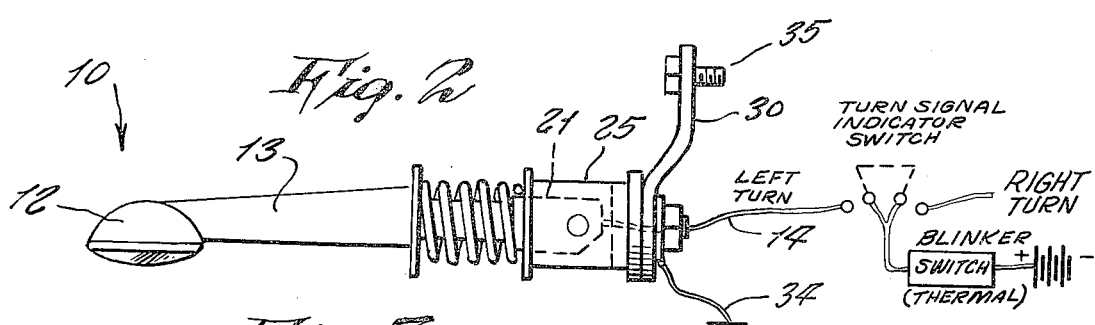
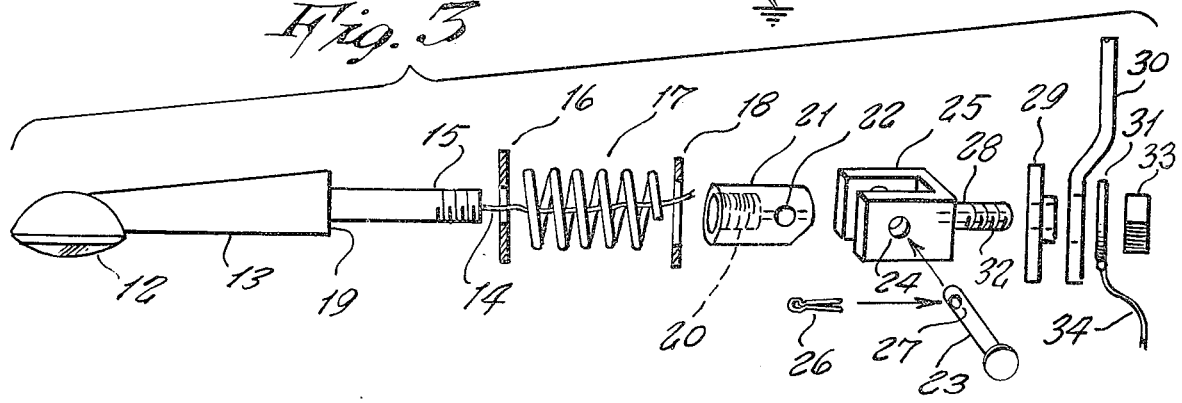

FOLD-AWAY REAR TURN INDICATORS FOR MOTORCYCLES

BACKGROUND OF THE INVENTION

This invention relates generally to mountings for left and right turn signals that are installed at a rear of motorcycles.

It is generally well know that a great many motorcycle enthusiasts like to ride the same, not only on streets and highways, but also for the sports of rural trail riding and hill climbing, and at which time the right and left turn rear signal can be a sideward obstruction, so that riders usually remove them in order that they are out of the way, and after which they must be re-installed for road traffic. This situation is accordingly in want of an improvement.

SUMMARY OF THE INVENTION

Therefore it is a principal object of the present invention to provide rear turn indicators for motorcycles which are mounted on fold-away brackets and are pivotable into a retracted position during trail riding and hill climbing, thereby eliminating the chore of dis-mantling and re-installing the turn signals.

Another object is to provide fold-away rear turn indicators for motorcycles which can be quickly and easily flipped between a use and non-use position whenever wanted.

Others objects are to provide fold-away rear turn indicators for motorcycles which are simple in design, inexpensive to manufacture, rugged in construction and efficient in operation.

BRIEF DESCRIPTION OF THE DRAWING

These and other objects will become readily evident upon a study of the following specification and the accompanying drawing wherein:

FIG. 1 is a rear view of a motorcycle, showing the fold-away rear turn indicators of a motorcycle in a sideward extended use position.

FIG. 2 is a top view of the left rear turn indicator as viewed in direction 2—2 of FIG. 1 schematically shown electrically connected.

FIG. 3 is an exploded perspective view of the composite thereof.

FIG. 4 is a top view of the left turn indicator of FIG. 2 shown folded rearward for trail riding and hill climbing.

DETAILED DESCRIPTION OF THE PREFERRED EMBODIMENT

Referring now to the drawing in detail. The reference numeral 10 represents fold-away rear turn indicators for a motorcycle 11, wherein the same includes a lamp unit 12 made with an arm 13 and which is the same as used in conventional rigid constructions. The arm is tubular in order to carry the lamp hot wire therethrough. The arm includes an externally threaded end 15 which is inserted through a first washer 16, then through a compression coil spring 17, and through a second washer 18, the first washer bearing against the arm shoulder 19. The threaded end 15 is then screwed into a threaded opening 20 in a sleeve 21. The sleeve has a transverse opening 22 for receiving a pivot pin 23 supported in transverse openings 24 of a forked bracket 25. The pin being retained from falling out by means of a cotter pin 26 fitted through pin transverse opening 27. The bracket is integral with a tubular stem 28 through which the hot wire extends. The stem is inserted successively through a spacer block 29, stationery plate 30 and electrical contact washer 31, such as is used in conventional rigid constructions. The bracket stem 28 having external screw thread 32 to be fitted with nut 33. A ground wire 34 is connected to the contact washer 31, while the hot wire 14 protruding from stem 28 leads to a battery power source. In the construtrion washer 18 bears against the end of bracket 25, so the spring force is thereagainst.

It is now evident that the plate 30 stationarily supported by screws 35 to the motorcycle frame, thus retains the bracket 25 stationarily while the sleeve affixed to the arm 13 is pivotable between the positions shown in FIGS. 2 and 4 as indicated by arrow 36.

It is to be noted that the compression force of spring 17 retains the arm snapped in either sideward or rearward position without any loose play, so it cannot be accidently dislodged from it's intended position, however, a simple push by the hand will flip it to the desired position.

Thus an improved mounting is provided for motorcycles rear directional turn indicators. It should be noted that such constructions are less likely to break if the motorcycle falls when they are in a sideward extended position, and they also permit the motorcycle to be more easily transported with the device in a retracted out of the way position.

While various changes may be made in the detail construction, it is understood that such changes will be within the spirit and scope of the present invention, as is defined by the appended claims.

I claim:

1. A pair of fold-away directional indicators for a motorcycle, comprising a left turn and a right turn indicator assembly, each of said assemblies connected to switch means on the motorcycle, each of said assemblies including a stationary unit mounted on opposite sides of the motorcycle frame, a pivotable unit connected to each turn indicator and mounted on each of said stationary units, wherein the indicators are in a normal laterally outwardly extending position therefrom, said pivotable units being selectively movable from said outward position to a rearward retracted position, each pivotable unit comprising a lamp unit integral with an arm and electrically connected to the switch means, a compression spring fitted on one end of said arm between washers for retaining the pivotable unit in one of the selected positions, each of the pivotable units being moved to said retracted position when trail riding with the motorcycle to prevent damage to the turn indicators if the motorcycle falls.

2. The fold-away directional indicators as set forth in claim 1, wherein each of said stationary units have one of said washers bearing against a shoulder on the arm and the other of said washers bearing on a forked bracket, a plate supporting said bracket, and said pivotable unit includes a sleeve secured to said one of said arm, said sleeve being pivotably mounted on said bracket.

* * * * *